(12) United States Patent
Nakano et al.

(10) Patent No.: US 7,565,500 B2
(45) Date of Patent: Jul. 21, 2009

(54) ALLOCATING STORAGE AREA ACCORDING TO PHYSICAL POSITION INFORMATION OF A STORAGE DEVICE

(75) Inventors: Yukio Nakano, Oyama (JP); Tatsundo Aoshima, Yokohama (JP); Shotaro Ohno, Yamato (JP)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 10/865,264

(22) Filed: Jun. 9, 2004

(65) Prior Publication Data

US 2005/0033936 A1 Feb. 10, 2005

(30) Foreign Application Priority Data

Mar. 23, 2004 (JP) ............................. 2004-084258

(51) Int. Cl.
G06F 12/00 (2006.01)

(52) U.S. Cl. ..................... 711/161; 711/162; 711/165; 711/170; 711/173; 707/204; 709/203; 709/211; 709/226

(58) Field of Classification Search ....................... None
See application file for complete search history.

(56) References Cited

U.S. PATENT DOCUMENTS 5,577,222 A * 11/1996 Micka et al. ................. 711/112
2001/0034795 A1 * 10/2001 Moulton et al. .............. 709/244
2003/0061491 A1 * 3/2003 Jaskiewicz et al. ........... 713/182
2004/0153481 A1 * 8/2004 Talluri ........................ 707/200

FOREIGN PATENT DOCUMENTS

JP 2002-222061 8/2002

* cited by examiner

Primary Examiner—Hyung S Sough
Assistant Examiner—Kaushikkumar Patel
(74) Attorney, Agent, or Firm—Townsend and Townsend and Crew LLP

(57) ABSTRACT

A method of allocating storage areas, intended to reserve the storage areas formed on a storage device for storing data, this method including the steps of: registering beforehand as a storage configuration information table 105, information on multiple storage areas to be managed and on the position where the storage device is installed; registering information on the purposes of use and positions of the storage areas beforehand as a position management table 107; acquiring position information from the position management table 107 in accordance with an allocation request for a storage area associated with the purpose of use; selecting an unallocated storage area from the storage configuration information table 105 with reference to the position information; and sending information on a selected area to a client from which the allocation request was issued.

3 Claims, 13 Drawing Sheets

FIG. 3

| | VOLUME NAME | MODEL No. | PERFORM-ANCE | RELIABILITY | POSITION INFORMATION LAYER 1 | POSITION INFORMATION LAYER 2 | POSITION INFORMATION LAYER 3 | ALLOCA-TION |
|---|---|---|---|---|---|---|---|---|
| 1 | vol 001 | RAID 100 | MEDIUM | MEDIUM | KANTO | HEAD OFFICE | FIRST CENTER | DONE |
| 2 | vol 002 | RAID 200 | HIGH | HIGH | KANTO | HEAD OFFICE | FIRST CENTER | DONE |
| 3 | vol 003 | RAID 200 | HIGH | HIGH | KANTO | HEAD OFFICE | FIRST CENTER | NOT DONE |
| 4 | vol 004 | RAID 100 | MEDIUM | MEDIUM | KANTO | HEAD OFFICE | SECOND CENTER | NOT DONE |
| 5 | vol 005 | RAID 100 | LOW | MEDIUM | KANTO | YOKOHAMA BRANCH OFFICE | COMPUTER ROOM | DONE |
| 6 | vol 006 | RAID 300 | MEDIUM | MEDIUM | KANSAI | OSAKA BRANCH OFFICE | FIRST CENTER | DONE |
| 7 | vol 007 | RAID 200 | MEDIUM | MEDIUM | KANSAI | OSAKA BRANCH OFFICE | FIRST CENTER | NOT DONE |

FIG. 4

| # | TYPE OF POLICY | PERFORMANCE | RELIABILITY |
|---|---|---|---|
| 1 | DEFAULT | MEDIUM | MEDIUM |
| 2 | MISSION CRITICAL | HIGH | HIGH |
| 3 | CENTER OF SEARCH | HIGH | LOW |

FIG. 5

| # | PURPOSE OF USE | POSITION INFORMATION LAYER 1 | POSITION INFORMATION LAYER 2 | POSITION INFORMATION LAYER 3 |
|---|---|---|---|---|
| 1 | DEFAULT | — | — | — |
| 2 | BACKUP | SAME | SAME | SAME |
| 3 | DISASTER RECOVERY | DIFFERENT | — | — |

FIG. 7

- AREA ACQUISITION

| HOST NAME | POLICY | AREA SIZE | PURPOSE OF USE | AREA NAME |
|---|---|---|---|---|
| DBMS1 | DEFAULT | 20GB | DEFAULT | |

OK   CANCEL

FIG. 8

- AREA ACQUISITION

| HOST NAME | POLICY | AREA SIZE | PURPOSE OF USE | AREA NAME |
|---|---|---|---|---|
| DBMS1 | MISSION CRITICAL | 20GB | BACKUP | vol002 |

OK    CANCEL

FIG. 9

- AREA ACQUISITION

| HOST NAME | POLICY | AREA SIZE | PURPOSE OF USE | AREA NAME |
|---|---|---|---|---|
| DBMS1 | DEFAULT | 20GB | DISASTER RECOVERY | vol001 |

OK    CANCEL

FIG. 13

| | VOLUME NAME | MODEL No. | PERFORM-ANCE | RELIABILITY | POSITION INFORMATION LAYER 1 | POSITION INFORMATION LAYER 2 | POSITION INFORMATION LAYER 3 | ALLOCA-TION | PURPOSE OF USE |
|---|---|---|---|---|---|---|---|---|---|
| 1 | vol 001 | RAID 100 | MEDIUM | MEDIUM | KANTO | HEAD OFFICE | FIRST CENTER | DONE | DISASTER RECOVERY |
| 2 | vol 002 | RAID 200 | HIGH | HIGH | KANTO | HEAD OFFICE | FIRST CENTER | DONE | BACKUP |
| 3 | vol 003 | RAID 200 | HIGH | HIGH | KANTO | HEAD OFFICE | FIRST CENTER | DONE | BACKUP |
| 4 | vol 004 | RAID 100 | MEDIUM | MEDIUM | KANTO | HEAD OFFICE | SECOND CENTER | NOT DONE | |
| 5 | vol 005 | RAID 100 | LOW | MEDIUM | KANTO | YOKOHAMA BRANCH OFFICE | COMPUTER ROOM | NOT DONE | |
| 6 | vol 006 | RAID 300 | MEDIUM | MEDIUM | KANSAI | OSAKA BRANCH OFFICE | FIRST CENTER | DONE | DEFAULT |
| 7 | vol 007 | RAID 200 | MEDIUM | MEDIUM | KANSAI | OSAKA BRANCH OFFICE | FIRST CENTER | DONE | DISASTER RECOVERY |

FIG. 14

| # | PURPOSE OF USE | POSITION INFORMATION LAYER 1 | POSITION INFORMATION LAYER 2 | POSITION INFORMATION LAYER 3 |
|---|---|---|---|---|
| 1 | DEFAULT | — | — | — |
| 2 | BACKUP | PROHIBITED | PROHIBITED | PROHIBITED |
| 3 | DISASTER RECOVERY | SAME | — | — |

FIG. 15

| # | PURPOSE OF USE | POSITION INFORMATION |
|---|---|---|
| 1 | DEFAULT | — |
| 2 | BACKUP | SAME POSITION |
| 3 | DISASTER RECOVERY | LOCATION DISTANCED THROUGH 500 KM OR MORE |

US 7,565,500 B2

ALLOCATING STORAGE AREA ACCORDING TO PHYSICAL POSITION INFORMATION OF A STORAGE DEVICE

CLAIM OF PRIORITY

The present application claims priority from Japanese Application Serial No. 2004-84258, filed on Mar. 23, 2004, the content of which is hereby incorporated by reference into this application.

BACKGROUND OF THE INVENTION

The present invention relates to a method for allocating storage areas, and more particularly, to a method for allocating the areas formed on a storage device in a storage management system, to a storage management server, and to a system including the same.

Systems for supplying storage to multiple servers using a SAN (Storage Area Network) environment are already commercialized. Recently, there is a tendency for all usable storage devices to be managed as single, shared virtual storage, regardless of the installation location and vendor of the storage device constituting the storage. When the virtualization of storage is thus realized, a user can reserve and use storage areas without being aware of an actual device.

For example, Japanese Patent Laid-open No. 2002-222061 discloses a technology for creating, for a plurality of servers in accordance with the predetermined abstract demand of a user, referred to as a policy, an appropriate storage area for storing information on the performance, reliability, and other factors of plural disk devices.

By the way, DBMS (Data Base Management System) for storing data in a shared database and responding to the access requests received from a plurality of users or application programs is already put into practical use. In some cases, when a user is to reserve either of the storage areas that the DBMS reserves and uses for purposes such as data storage, backup, disaster recovery, and operation work, the user must be aware of the installation location of the device. For example, a backup area against disk failures needs to be allocated to a location close to the backup source in order to allow rapid recovery from the failure. Conversely, it is preferable that a backup area against failures due to disasters should be reserved at a location distant from the backup source.

According to the above conventional technology, the virtualization of storage makes storage areas physically invisible. The virtualization of storage has an advantage in that all areas can be logically handled. At the same time, however, because of the virtualization, there occurs the problem that it is not possible to reserve a storage area or to acquire an area with awareness of the installation location of the storage device.

SUMMARY OF THE INVENTION

An object of the present invention is to allocate storage areas of a storage device with physical positions of these storage areas taken into consideration.

More specifically, an object of the present invention is to provide: a method for allocating storage areas that allows storage area allocation by selecting a data storage destination according to a particular purpose of use of data, such as backup or disaster recovery; and a storage management system allowing the above allocation.

The present invention provides a method for allocating storage areas, intended to reserve the storage areas formed on a storage device for storing data. This allocation method includes the steps of: previously registering information on multiple storage areas to be managed and on the position where the storage device is installed; previously registering information on the purposes of use and positions of the storage areas; upon receipt of an allocation request for an area associated with the purpose of use acquiring information on the positions of the storage areas; selecting an unallocated area with reference to the acquired information on the positions; and transmitting, to an issue source of the allocation request, information on the unallocated area selected.

Preferably, information on multiple volumes to be managed and on an installation position of a storage device on which volumes are to be formed, is registered as storage configuration information in a memory of a storage management server beforehand, and information on the purposes of use and positions of the volumes is registered as a position management table in the memory beforehand.

Preferably, the purposes of use of volumes and the performance and/or reliability requirements of the volumes that are associated with the purposes of use are registered as a policy management table in a memory beforehand, and storage configuration information also holds performance and/or reliability requirement information on the volumes, associated with the purposes of use thereof; wherein, upon receipt of an allocation request for a volume whose purpose of use is to be specified, a position management table and the policy management table are referred to according to the specified purpose of use, then the storage configuration information is referred to in relation to the volume selected as a result of the above reference, and an unallocated volume is reserved as the volume to be allocated.

In addition, the above allocation request is transmitted from a storage management client to a storage management server, preferably, along with at least information on an allocated volume and information on the purpose of use of a new allocation request.

Preferably, the information on positions of the storage areas is registered in a plurality of hierarchical formats in an associated condition with a specific purpose of use.

In an embodiment of the present invention, information for specifying whether to select areas of the same value as, or of a value different from, position information on acquired areas, is registered as the information for identifying the positions of areas.

In addition, preferably, in connection with the relationship between information on the purpose of use of an area and information on the position of the area, if the area, is to be used for backup, information indicating the same position is memory-registered as information of the position, and if the area is to be used for disaster recovery, information indicating a different position is memory-registered as information of the position.

Preferably, a migration management table for registering the relationship between information on the purposes of use and information on positions is registered beforehand so as to be referred to when a migration destination area is requested.

Preferably, if the area is to be used for migration, the area is excluded from area allocation.

In an embodiment of the present invention, when a storage area is to be allocated, a display screen for displaying items on a host name of a host for executing an application program, on a policy, on a size of the area to be acquired, on a purpose of use of the area requested, and on a name of an acquired area, is displayed on a display device of a storage management client. After the above display, necessary information is input to the above items on the display screen by use of an input device, and an allocation request that requires information of an item to which the necessary information has been input is transmitted from the storage management client to a storage management server.

The present invention is recognized as a program for implementing the above method.

The present invention is recognized as a migration-implementing method for implementing migration with respect to the areas formed on a storage device managed by a storage management system. More specifically, the migration-implementing method of the present invention includes the steps of: acquiring information on a purpose of use of an area for which the migration is to be implemented; referring to acquired information on a purpose of use, judging whether the migration is to be implemented with respect to an area; and, if judgment results indicate matching to conditions, implementing the migration with respect to the area allocated as a migration destination, or if the purpose of use of the specified area is backup, skipping both the acquisition of a new area and the implementation of the migration.

Preferably, in a migration-implementing method for implementing migration with respect to the areas formed on a storage device managed by a storage management system, information on a purpose of use of an area for which the migration is to be implemented, and on a position of the area, is acquired first. Next, acquired information on the purpose of use and position of the area is referred to and whether the migration is to be implemented with respect to a certain area is judged. After selection of an area judged to match in terms of conditions, the migration is implemented with respect to the selected area.

The present invention is recognized as a storage management server for managing a usage status of the areas formed on a storage device for storing data.

More specifically, the storage management server of the present invention has: a memory for registering information on multiple areas to be managed and on a position in which the storage device is installed; and a CPU for conducting an area acquisition process in accordance with a purpose-of-use-associated area allocation request from a storage management client by first acquiring position information from the purpose of use specified along with the allocation request, and then selecting an unallocated area with reference to the acquired position information; after the above process, the CPU transmits information on the selected area to the storage management client that has issued the allocation request.

In an embodiment of the present invention, the above memory stores: storage configuration information for registering two types of information beforehand (information on volume names of all volumes to be managed, on performance and reliability requirements thereof, and on the installation location of the storage device on which the volumes are to be formed, and allocation information indicating whether the volumes are already allocated); a position management table for registering information on the purpose of use and position of each volume is to be registered; and a policy management table for registering the relationship between the purpose of use of each volume and performance/reliability requirements thereof.

Also, upon receipt of an allocation request for a volume whose purpose of use is to be specified, the CPU makes reference to the position management table and the policy management table in accordance with a specified purpose of use, then makes reference to the storage configuration information in relation to the volume selected as a result of the above reference, and reserves an unallocated volume as the volume to be allocated.

Preferably, the above position management table is where, if the volume is to be used for backup, information indicating the same position is registered as information of the position, or if the volume is to be used for disaster recovery, information indicating a different position is registered as information of the position.

The present invention is also recognized as a storage management client connected to a storage management server. More specifically, this storage management client has a display device for displaying a display screen which displays at least items on the purpose-of-use requested for the area acquired, and on area names of acquired areas, and an input device for input of necessary information to the items of the display screen. In this configuration, when an area is acquired, an allocation request associated with the information input to the items of the display screen is transmitted to the storage management server, and information on an acquired area is received from the storage management server and displayed on the display screen of the display device.

BRIEF DESCRIPTION OF THE DRAWINGS

FIG. 3 is a diagram showing an example of storage configuration information 105 according to the first embodiment;

FIG. 4 is a diagram showing an example of a policy management table 106 according to the first embodiment;

FIG. 5 is a diagram showing an example of a position management table 107 according to the first embodiment;

FIG. 7 is a diagram showing an example of a display screen for requesting area acquisition;

FIG. 8 is a diagram showing another example of a display screen for requesting area acquisition;

FIG. 9 is a diagram showing a yet another example of a display screen for requesting area acquisition;

FIG. 13 is a diagram showing an example of storage configuration information 105 according to the second embodiment;

FIG. 14 is a diagram showing an example of a migration position management table 1002; and FIG. 15 is a diagram showing an example of a position management table according to a third embodiment.

DESCRIPTION OF THE PREFERRED EMBODIMENTS

Embodiments of the present invention are described in detail below with reference to the accompanying drawings.

Figure 1:
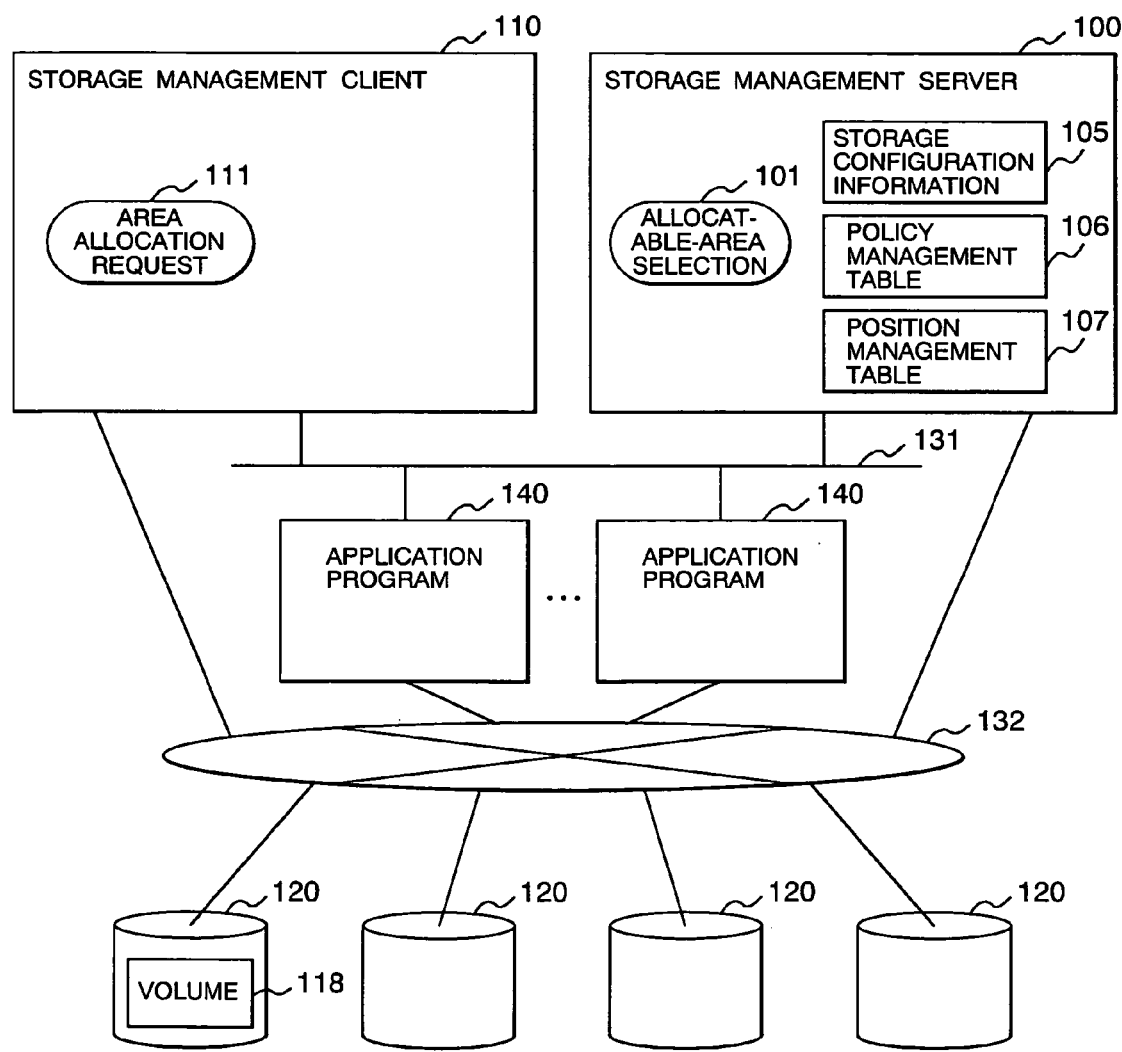
FIG. 1 is a diagram showing the total configuration of a storage management system according to a first embodiment.
Figure 2:
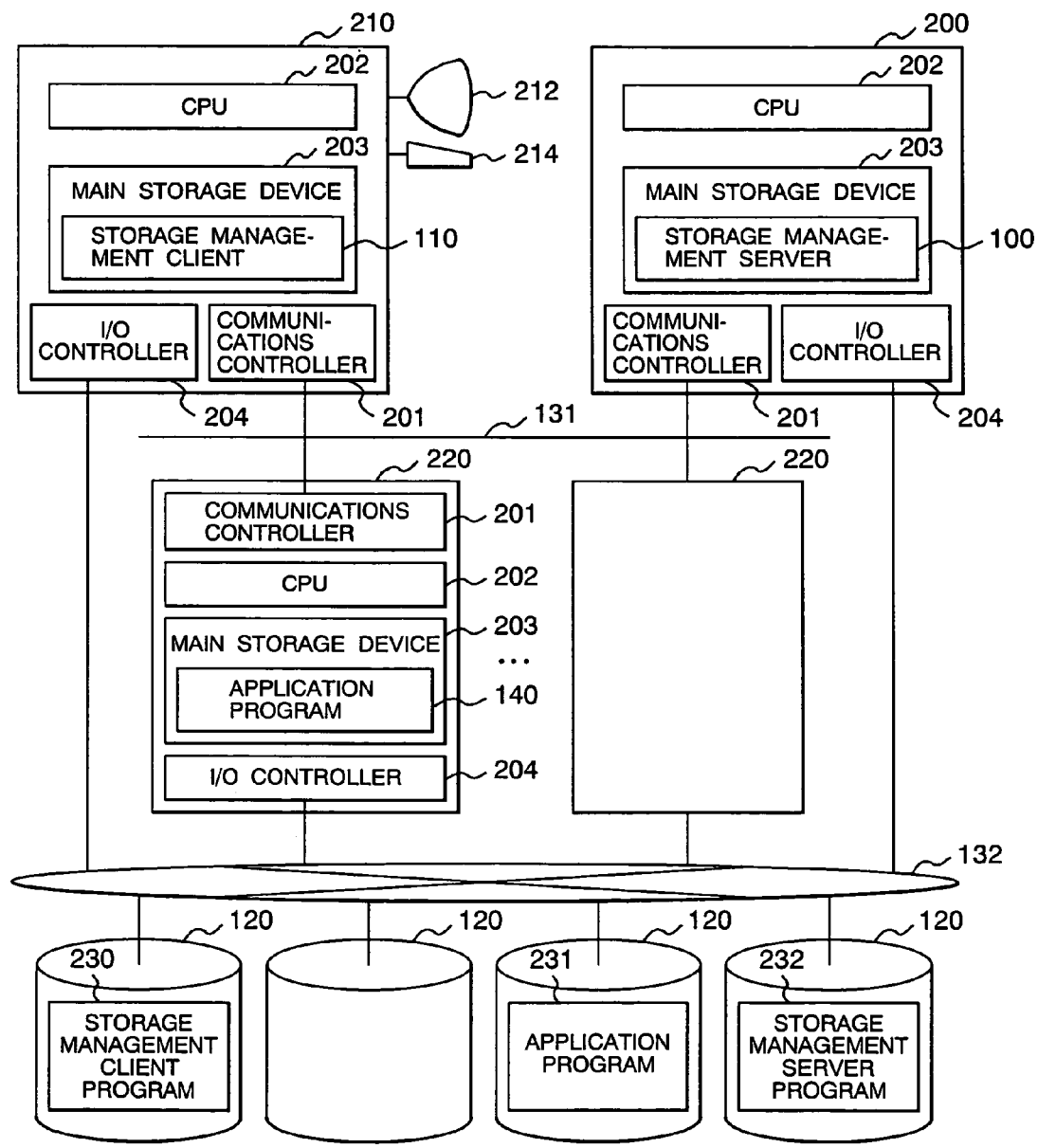
FIG. 2 is a diagram showing the hardware configuration of the system to which the first embodiment is applied.

FIG. 1 shows the total configuration of a storage management system according to a first embodiment. FIG. 2 shows the hardware configuration of the system.

First, the hardware configuration is described with reference to FIG. 2.

This system includes information processors 200, 210, and 220, communications controllers 201, and storage devices 120, and each of these system components is connected to a SAN (Storage Area Network) 132.

The information processor 200 includes a communications controller 201, a CPU 202, a main storage device 203, and an I/O controller 204, and as described on later pages, functions as a storage management server 100. The storage management server 100 conducts processing by loading into the main storage device 203 a storage management server program 232 stored within each of the storage devices 120, and then executing the server program 232 in the CPU 202. The I/O controller 204 manages each storage device 120 connected to the SAN 132, and performs data read/write operations on each storage device 120. The communications controller 201 exchanges data with other information processors via a network 131.

Similarly, the information processor 210 also includes a communications controller 201, a CPU 202, a main storage device 203, an I/O controller 204, a display device 212, and an input device 214, and functions as a storage management client 110. The information processor 210 is, for example, a personal computer (PC), and is operated by a system administrator in order to conduct storage management.

The storage management client 110 conducts processing by loading into the main storage device 203 a storage management client program 230 stored within each storage device 120, and then executing the client program 230 in the CPU 202. The I/O controller 204 performs data read/write operations on each storage device 120 via the SAN 132. The communications controller 201 exchanges data with other information processors via the network 131.

The information processor 220 is also of a similar construction, and various application programs are loaded from the storage device 120 into the main storage device 203 and executed as application programs 140.

Next, functions of the storage management system are described with reference to the system configuration diagram of FIG. 1.

The storage management server 100 of this storage management system has storage configuration information 105, a policy management table 106, a position management table 107, and a program for an allocatable-area selection process 101. The storage configuration information 105, the policy management table 106, and the position management table 107 are each of a table format and stored in the main storage device 203 of the information processor 200. Details of these table configurations are described later with reference to FIGS. 3 to 5. The program for the allocatable-area selection process 101 is also stored in the main storage device 203 similarly, and the program for the allocatable-area selection process 101 is executed by the CPU 202 in order to conduct required processing.

The storage management client 110 issues to the storage management server 100 an area allocation request 111 with respect to the storage device that the application programs 140 are to use. Although one storage management client 110 only is shown in FIG. 1, multiple clients 110 may be actually connected to the network 131 and the SAN 132. The application programs 140 are, for example, a database management system (DBMS), on-line processing, batch processing, or other programs, and these programs 140 execute respective processes using the areas reserved within the storage device 120.

Next, the storage configuration information 105, the policy management table 106, and the position management table 107 are described in detail below.

The storage configuration information 105 manages all storage devices 120 connected to the SAN (Storage Area Network) 132. More specifically, as shown in FIG. 3, volume names, model numbers, performance, reliability, position information, and area allocation information are registered in the storage configuration information 105, and individual volumes of all storage devices 120 connected to the SAN 132 are managed by the storage configuration information 105. The position information is information that indicates physical positions or locations at which the storage devices are actually installed. The position information is set in a hierarchical format with three position information layers, 1 to 3, to allow for the fact that the information can be set in a multi-stepwise fashion for position.

FIG. 4 shows an example of the policy management table 106.

Combinations of the conditions composed of performance requirements and reliability requirements, are registered as policies in the policy management table 106. That is to say, information on performance requirements and reliability requirements is registered as three split types of policies, "High", "Medium", and "Low". The performance here refers to, for instance, an average I/O execution time for a storage device. Reliability refers to, for instance, an error rate per unit time.

In the illustrated example, three policies are registered. A first policy is a default setting, wherein storage devices of the "Medium" level are specified for both performance and reliability. A second policy is a mission-critical setting, wherein storage devices of the "High" level are specified for both performance and reliability. A third policy is a center-of-search setting, wherein storage devices are registered with the "High" level for performance and the "Low" level for reliability.

These policies are previously created and registered so that, for example, storage devices of high performance and reliability will be allocated for high-load application programs, including OLTP (On-Line Transaction Processing), and storage devices of low performance and reliability, for application programs of low importance. When areas are acquired for each application program, the policy management table 106 is referred to and processing is conducted to acquire the areas.

FIG. 5 shows an example of the position management table 107.

The position management table 107 defines installation locations, namely, physical positions of, individual storage devices when storage areas are to be reserved for each purpose of use. In this example, three purposes of use are registered. A first purpose of use is a default setting without a specification item for position information. A second purpose of use is intended for backup, and is set for specifying storage devices whose areas take the same value in position information layer 3. A third purpose of use is intended for disaster recovery, and is set for specifying storage devices whose areas take different values in position information layer 1.

FIGS. 7 to 9 each show an example of a display screen for area allocation requests.

When area allocation is requested, "Host Name" (the name of a host which is to use an area), "Policy", "Area Size" (necessary area size), "Purpose of Use", and "Area Name" are displayed on a display screen of the display device 212 connected to the storage management client 110. An area is allocated by specifying these display items. These display items are specified referring to management tables and/or by input from the input device 214. At "Policy" on this display screen, either of the policies registered in the policy management table of FIG. 1 is selectively specified. At "Purpose of Use", either of the purposes-of-use registered in the position management table 107 of FIG. 5 is selectively specified. At "Area Name", a name of an area whose purpose of use is to be specified is input and specified from the input device 214.

Figure 6:
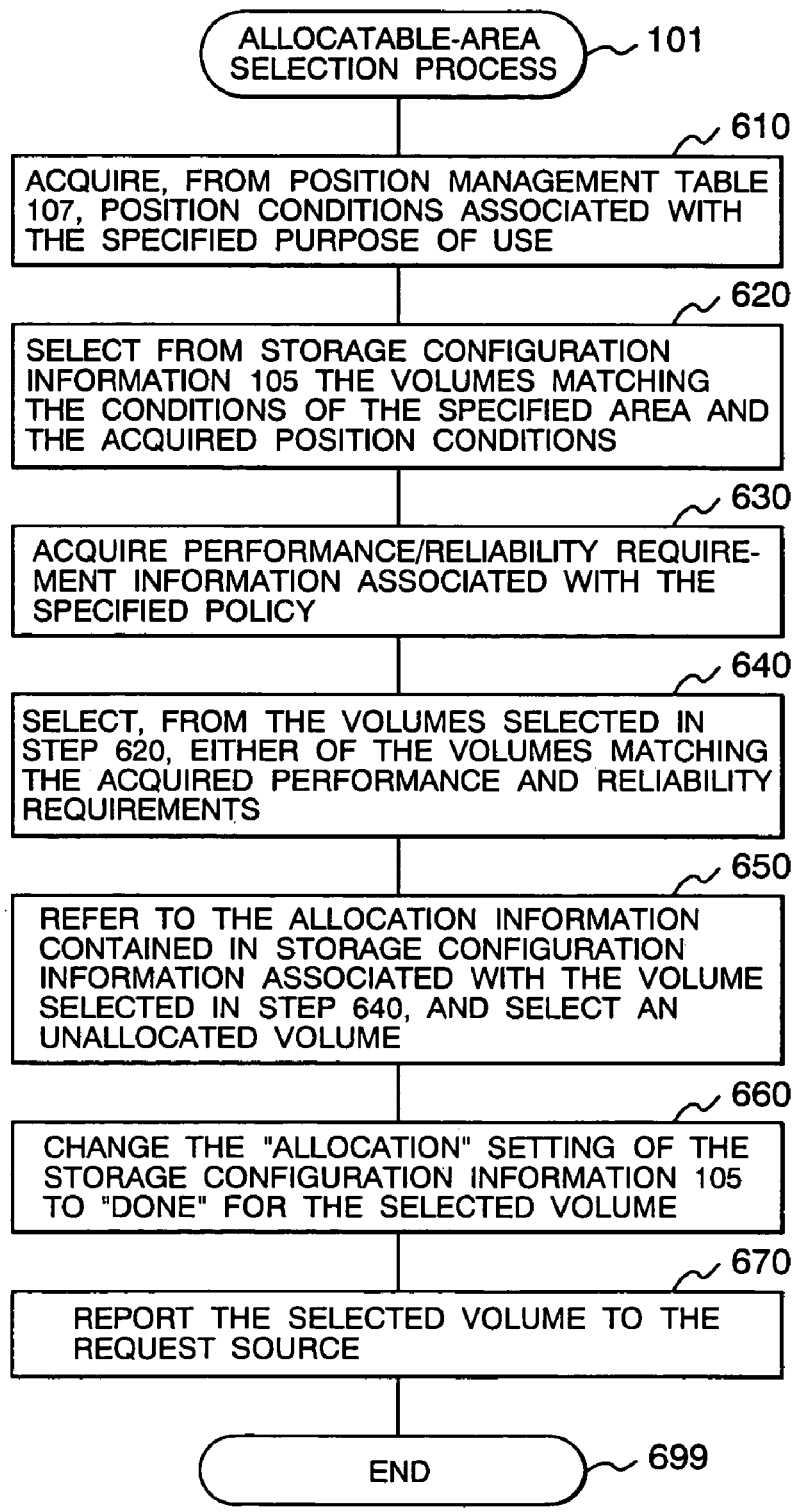
FIG. 6 is a flowchart showing the flow of allocatable-area selection according to the first embodiment.

Next, allocatable-area selection in storage management is described referring to the flowchart of FIG. 6.

When a storage area becomes necessary for execution of any one of the application programs 140 shown in FIG. 1, an area allocation request 111 is issued from the storage management client 110 to the storage management server 100. After accepting the area allocation request 111 from the storage management client 110, the storage management server 100 executes an allocatable-area selection process 101.

During the allocatable-area selection process 101, first, in step 610, position conditions associated with the purpose of use that was specified in accordance with the display screen of FIG. 7 are acquired from the position management table 107. After this, in step 620, in accordance with the conditions relating to the area specified from the display screen of FIG. 7, and with the acquired position conditions, the volumes matching these two types of conditions are selected from the storage configuration information 105 of FIG. 1.

Next, in step 630, information on performance and reliability requirements associated with the policy that was specified in FIG. 7 is acquired from the policy management table 106. After this, in step 640, either of the volumes matching the acquired performance and reliability requirements is selected from the volumes selected in step 620 above. Next, in step 650, allocation information within the storage configuration information 105 is referred to for the volume selected in step 640 above, and an unallocated volume is selected. In step 660, for the thus-selected volume allocation information, "Done" is assigned under "Allocation" in the storage configuration information 105. Finally, in step 670, the volume name of the selected volume is reported to the client 110 that issued the request, and the process is thus completed in step 699.

Further details are described below using more specific examples.

The description here assumes that the storage configuration information 105, the policy management table 106, and the position management table 107 are registered as shown in FIGS. 3 to 5, respectively, and that the area allocation request shown in FIG. 7 is conducted.

Processing in the case where "Default" is specified is described as a first example below.

First, the position information layer 1, position information layer 2, and position information layer 3 associated with the "Default" value specified under "Purpose of Use" are derived from the position management table 107. In this case, since conditions relating to the position information layer 1, the position information layer 2, and the position information layer 3 are not specified at "Default" in the position management table 107, all volumes in FIG. 3 are selectable in step 620 of FIG. 6.

Next, in step 630, performance and reliability requirements associated with "Default" specified under "Policy" are derived from the policy management table 106. For both performance and reliability, "Medium" is acquired from "Default" in the policy management table 106. In step 640, the volumes matching the acquired performance and reliability requirements are selected from all volumes that were selected in step 620. Volumes of "Medium" in both performance and reliability are selected from all volumes that were selected in step 620. In other words, "vol001", "vol004", "vol006", and "vol007" that constitute an area of "Medium" performance and "Medium" reliability are selected from the storage configuration information (configuration information table) 105 of FIG. 3.

Next, in step 650, the "Allocation" item in the storage configuration information 105, associated with the above-selected volumes, is referred to and unallocated volumes are selected. In this example, "vol004" and "vol007" are unallocated and "vol004" out of the two is selected as the volume of the smaller number in terms of order in the registered table. After this, in step 660, the allocation setting of this selected volume "vol004" is changed to "Done" and the volume name of "vol004" is reported as allocation information to the storage management client 110 that issued the request. The volume name, after being received by the storage management client 110, is displayed on the display screen of the display device 212. Thus, the system administrator for the storage management system can understand that, for example, as in the "Default" setting of "Purpose of Use" in FIG. 7, a 20-gigabyte(GB) area has been reserved.

Next, processing in the case where "Backup" is specified is described as a second example below.

The description here assumes that area allocation is requested as in the display screen example of FIG. 8.

First, in step 610 of FIG. 6, the position information layer 1, position information layer 2, and position information layer 3 associated with the "Backup" value specified under "Purpose of Use" are derived from the position management table 107. Under the position information layer 1, the position information layer 2, and the position information layer 3, the value of "Same" is specified as position management table conditions associated with "Backup".

Accordingly, in step 620, in accordance with the conditions relating to the area specified on the display screen of FIG. 8, and with the conditions relating to acquired position information, the volumes matching the two types of conditions are selected from the storage configuration information 105. Since "vol002" is specified under "Area Name" on the display screen of FIG. 8, "vol001" and "vol003" that both have the same value as that of the position information layer 3 of "vol002" are selected from the storage configuration information 105 of FIG. 3.

After this, in step 630, performance and reliability requirements associated with "Mission Critical" specified under "Policy" on the display screen of FIG. 8 are derived from the policy management table 106. "High" is acquired for both the performance requirements and reliability requirements associated with "Mission Critical" in the policy management table 106.

In step 640, only the volume matching the acquired performance and reliability requirements is selected from all volumes that were selected in step 620. Although the volumes selected in step 620 are "vol001" and "vol003", only "vol003" is selected that is of "High" performance and "High" reliability.

Next, in step 650, the "Allocation" item in the storage configuration information 105, associated with the above-selected volume "vol003", is referred to and an unallocated volume is selected. Since "vol003" is unallocated, the allocation setting of this selected volume "vol003" is changed to "Done" in step 660 and the allocated volume name "vol003" is reported to the request source in step 670.

Next, processing in the case where "Disaster Recovery" is specified is described as a third example below.

The description here assumes that area allocation is requested as in the display screen example of FIG. 9.

First, in step 610 of FIG. 6, the position information layer 1, position information layer 2, and position information layer 3 associated with the "Disaster Recovery" value specified under "Purpose of Use" are derived from the position management table 107. Under the position information layer 1, the value of "Different" is specified as position management table conditions associated with "Disaster Recovery".

Accordingly, in step 620, in accordance with the conditions relating to the area specified on the display screen of FIG. 9, and with the conditions relating to acquired position information, the volumes matching the two types of conditions are selected from the storage configuration information 105. Since "vol001" is specified under "Area Name" on the display screen of FIG. 9, "vol006" and "vol007" that both have a value (in this example, "Kansai") different from the value (in this example, "Kanto") of the position information layer 1 of "vol001" are selected from the storage configuration information 105. ("Kansai" and "Kanto" are the names of areas when the land of Japan is broadly divided into several areas.) After this, in step 630, performance and reliability requirements associated with "Default" specified under "Policy" on the display screen of FIG. 9 are derived from the policy management table 106. For both the performance requirements and the reliability requirements, "Medium" is acquired from "Default" in the policy management table of FIG. 4.

In step 640, the volumes matching the acquired performance and reliability requirements are selected from all volumes that were selected in step 620. The volumes selected in step 620 are "vol006" and vol007", and since both volumes are of "Medium" performance and "Medium" reliability, "vol006" and vol007" are selected in this case.

Next, in step 650, the "Allocation" item in the storage configuration information 105, associated with the above-selected volumes, is referred to and unallocated volumes are selected. In this example, since "vol006" is already allocated and "vol007" is unallocated, only "vol007" is selected. In step 660, the allocation setting of this selected volume "vol007" is changed to "Done", and, in step 670, the allocated volume name "vol007" is reported to the request source. This completes processing.

In the above first example with "Default" specified under "Purpose of Use", since there are no conditions on position, all volumes associated with the policy have been subjected to allocation. In the second example with "Backup" specified under "Purpose of Use", areas having the same value as that of the position information layer 3 are subjected to allocation. By assigning the same value to the position information layer 3 for areas present at relatively close positions such as the same business operations center, floor, or building, areas present at close positions are selected when areas for "Backup" are acquired.

In the third example where "Disaster Recovery" is specified, volumes each having a value different from that of the position information layer 1 are subjected to allocation. In this case, by dividing locations into groups such as prefectures, regions, and/or districts, and specifying the position information layer 1 from these groups, it is possible to select storage devices present at locations whose values are different from that value of the position information layer 1 which was displayed under "Area Name".

According to the embodiment described above, when an area is to be allocated in response to a request for storage area reservation, a location-aware area can be reserved by selecting an area (such as a volume) according to a specified purpose of use and the locational conditions of an area related to the purpose of use. For example, a backup area, a disaster recovery area, and/or other areas can be reserved by specifying each in terms of physical position according to a particular purpose of use.

Next, a second embodiment is described below with reference to FIG. 10 onward.

A first example relates to storage management in which, when migration is implemented with respect to an area (volume) that has been reserved with awareness of a purpose-of-use in accordance with position information, the implementation of the migration is prohibited if the area is set for a specific purpose of use. The relationship in position between the area originally set for the specific purpose of use, and an associated destination area, therefore, can be prevented from being disturbed.

Figure 10:
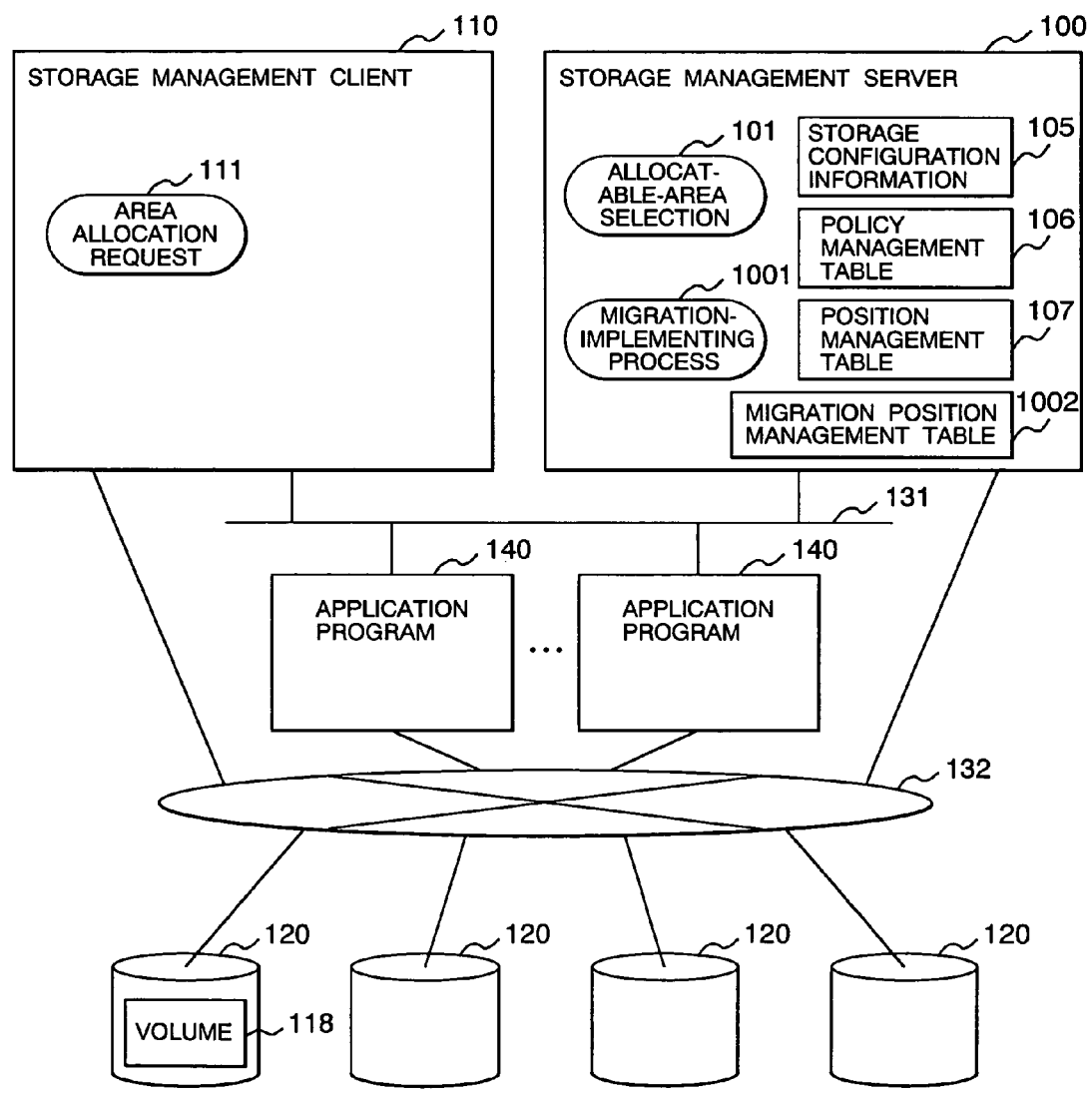
FIG. 10 is a diagram showing the total configuration of a storage management system according to a second embodiment.

FIG. 10 shows the total configuration of the storage management system according to the second embodiment.

In terms of total configuration, this system differs from that of FIG. 1 in that a migration position management table 1002 and a migration-implementing process 1001 are added within the storage management server 100. The migration-implementing process 1001 moves, from a high-speed area group to a low-speed area group, the areas that decreased in the frequency of use, and is a function realized by the CPU 202 by executing software. The migration-implementing process 1001 is a process causing a scheduler to automatically execute periodically, for example, once a day, and the process itself is not particularly new. However, this process is meaningful in that the implementation of migration is prohibited with respect to the specific areas set in accordance with the migration position management table 1002. This system is of the same hardware configuration as that of FIG. 2.

As shown in FIG. 13, volume names, model numbers, performance, reliability, position information, area allocation information, and purposes of use of volumes are registered in the storage configuration information 105, and individual volumes of all storage devices 120 connected to the SAN 132 are managed by the storage configuration information 105.

The migration position management table 1002 is a table in which, as shown in FIG. 14, conditions relating to the installation locations of migration destination volumes are registered for each purpose of use of each volume. For example, for backup, "Prohibited" is registered for all position information layers 1 to 3.

Next, an area allocation process for storage management is described with reference to the flowchart of FIG. 11.

When a storage area becomes necessary for execution of either of the application programs 140 shown in FIG. 10, an area allocation request 111 is issued from the storage management client 110 to the storage management server 100. This allocation request is issued by specifying, similarly to the first embodiment, as shown in FIGS. 7 to 9, the name of the host to use that storage area, the policy, the necessary area size, the purpose of use, and the name of the area.

After accepting the area allocation request 111 from the storage management client 110, the storage management server 100 executes an allocatable-area selection process 101.

Figure 11:
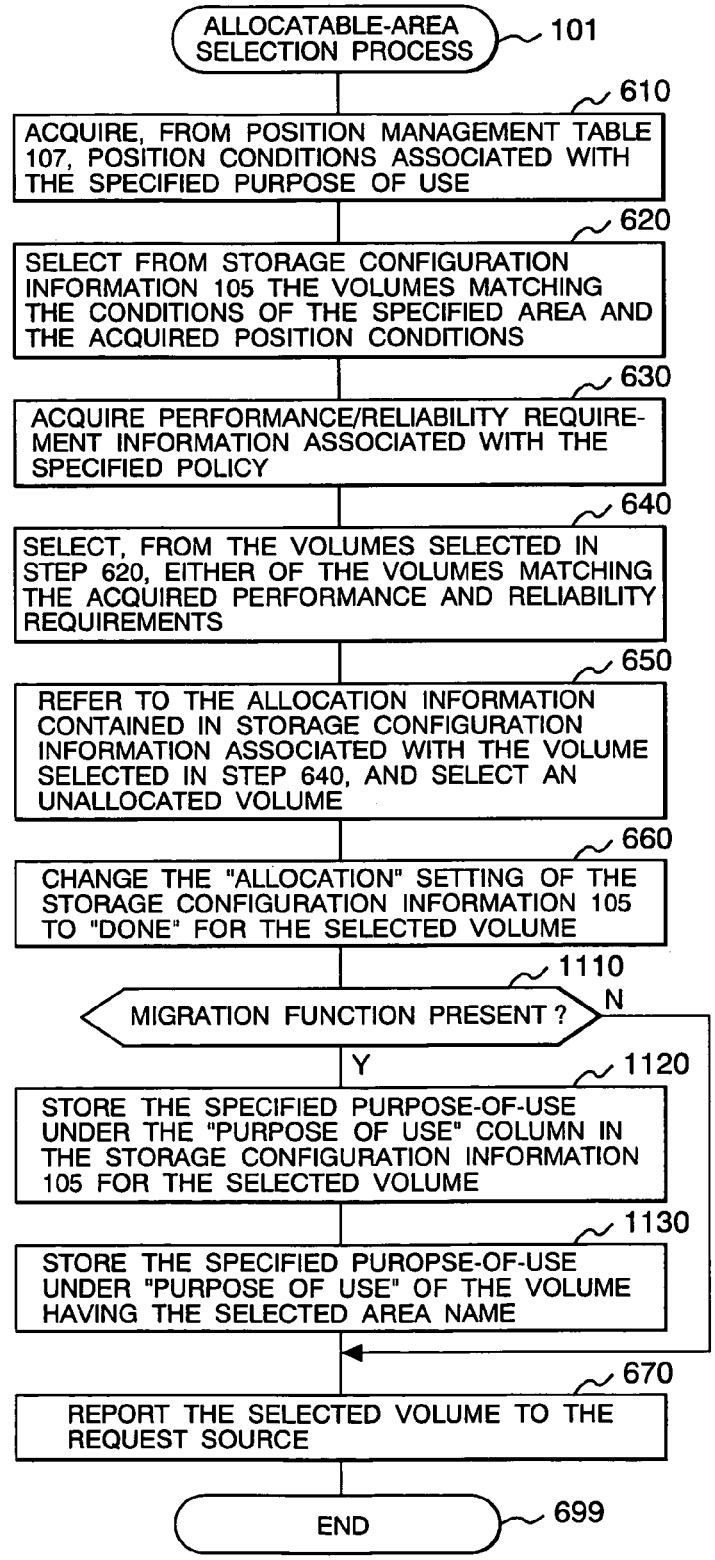
FIG. 11 is a flowchart showing the flow of allocatable-area selection according to the second embodiment.

In terms of process operation, steps 610 to 660, 670, and 699, among the process steps shown in FIG. 11, are the same as the equivalents of FIG. 6, and the process in this case differs in that steps 1110 to 1130 are added. However, description is started from the first step.

During the allocatable-area selection process, first, in step 610 of FIG. 11, position conditions associated with the purpose of use that was specified in accordance with the display screen of FIG. 7 are acquired from the position management table 107. After this, in step 620, in accordance with the conditions relating to the specified area and with the acquired position conditions, the volumes matching these two types of conditions are selected from the storage configuration information 105. Next, in step 630, information on performance and reliability requirements associated with the specified policy is acquired from the policy management table 106. After this, in step 640, either of the volumes matching the acquired performance and reliability requirements is selected from the volumes selected in step 620 above.

Next, in step 650, allocation information within the storage configuration information 105 is referred to for the volume selected in step 640 above, and an unallocated volume is selected. In step 660, allocation information (see FIG. 14) that relates to the selected volume is changed to "Done".

Next, whether a migration function is present is judged in step 1110. If the function is not present (migration is not specified), the process is terminated in step 1299.

Conversely, if migration is specified, the purpose of use is registered in the storage configuration information 105. At this time, the purpose of use is specified, for example, in accordance with the display screen of FIG. 9.

In step 1120, information on the purpose of use that was specified from the display screen is stored under the "Purpose of Use" column relating to the volume (volume remaining unallocated up until now) of the selected area name within the storage configuration information 105. After this, in step 1130, "Disaster Recovery" is stored, as the purpose of use, under the purpose-of-use column of the volume (original volume) of the originally specified area name, for example, originally specified "vol001" on the screen of FIG. 9. Finally, in step 670, the volume name of the selected volume is reported to the request source, and the process is completed.

Next, implementation of migration is described with reference to FIG. 12.

Migration is performed on the areas that decreased in the frequency of use. Prior to the start of this process, the frequency of use of reserved areas is periodically checked and the areas that decreased in the frequency of use are selected. Although the selection of these areas is not shown in FIG. 12, it may be conducted using a conventional method.

In step 1220, after selection of an area on which the migration process is to be performed, purpose-of-use and position information on that area is acquired. Next, in step 1230, migration position conditions associated with the acquired purpose of use are acquired from the migration position management table 1002 of FIG. 14.

Next, in step 1240, a judgment as to whether the migration can be implemented is conducted from the migration position conditions associated with the acquired position information and the purpose of use. If the implementation of the migration is judged impossible, the process is terminated without the migration being implemented.

Conversely, if the implementation of the migration is judged to be possible, the volumes matching the migration position conditions associated with the acquired position information and the purpose of use are selected from the storage configuration information 105 in step 1250, and the destination of the migration is determined from the selected volumes in step 1260. After this, in step 1270, the migration is implemented with respect to the volume finally selected.

The migration-implementing process is described in further detail below using more specific examples.

Assume that, as shown in FIG. 14, for instance, the relationship between the purposes of use and position information is registered in the migration position management table 1002. That is, this relationship indicates that the first purpose of use is a default setting without any specification items set for position information. The relationship also indicates that the second purpose of use is backup with migration set to "Prohibited", and that the third purpose of use is disaster recovery and set so that the positions of the areas taking the same value as that of the position information layer 1 will be selected.

Figure 12:
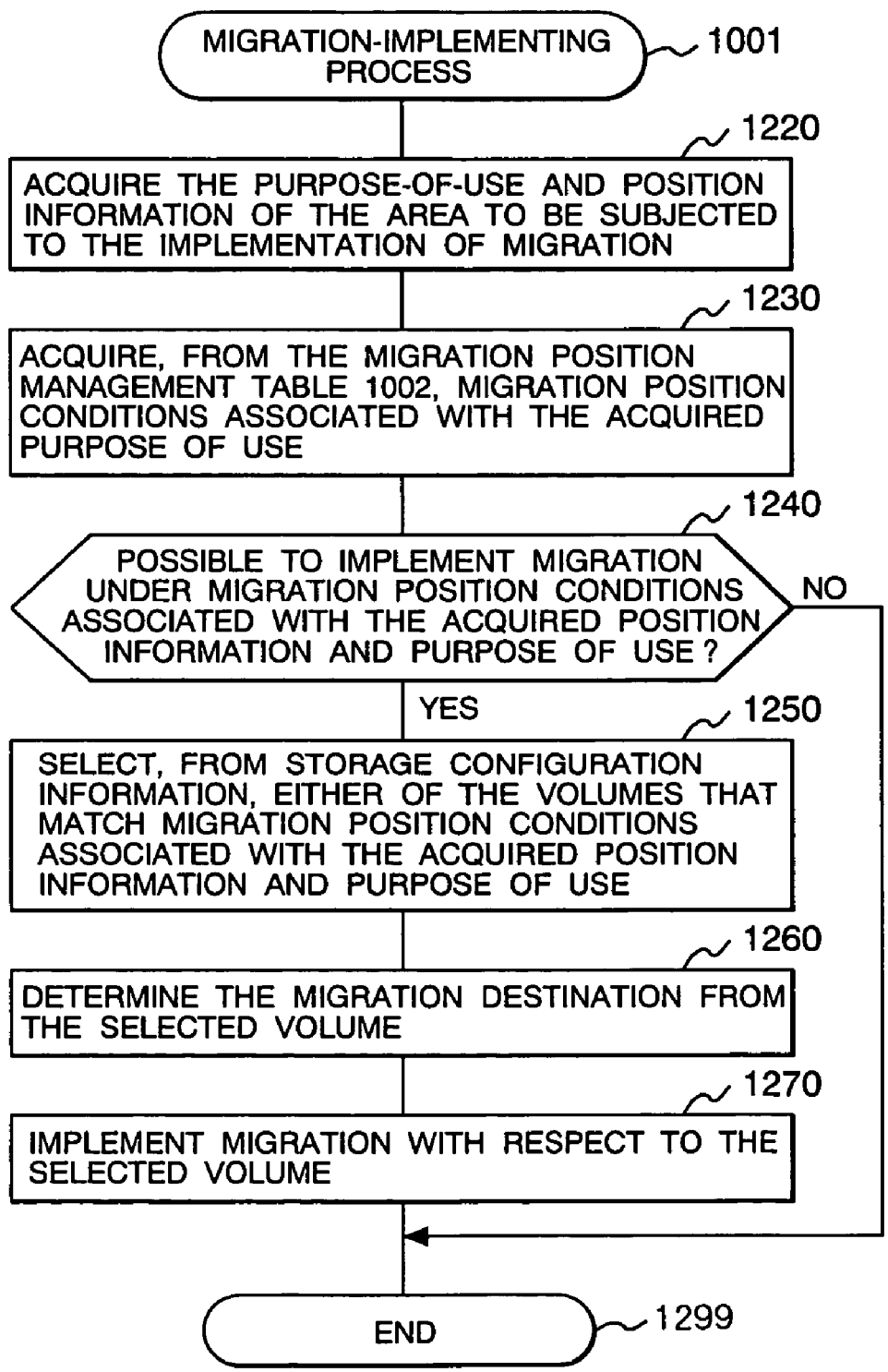
FIG. 12 is a flowchart showing the flow of implementation of migration according to the second embodiment.

In the example of storage configuration information 105 that is shown in FIG. 13, when migration is to be performed on "vol001", the purpose of use and position of the area selected as the migration destination are acquired from the storage configuration information 105 in step 1220 of FIG. 12. In other words, "Disaster Recovery" is acquired as the purpose of use of "vol001", "Kanto" as the position information layer 1, "Head Office" as the position information layer 2, and "First Center" as the position information layer 3.

Next, in step 1230, migration position conditions associated with the acquired purpose of use are acquired from the migration position management table 1002. In this case, the migration position conditions taking the same value as that of the position information layer 1 are specified for "Disaster Recovery" as the purpose of use. After this, whether the migration can be implemented under the above position conditions is judged in step 1240. In this case, the implementation is possible since "Prohibited" is not set for the position information layer 1.

Next, in step 1250, the volumes that match migration position conditions associated with the acquired position information and the purpose of use are acquired from the storage configuration information 105. Unallocated "vol004" and "vol005" are selected from the volumes that match acquired position information layer 1 "Kanto", position information layer 2 "Head Office", and position information layer 3 "First Center", and the migration position conditions associated with the purpose of use that take the same value as that of the position information layer 1.

In step 1260, of the selected volumes "vol1004" and "vol1005", "vol1004" smaller in registration sequence number is determined as the migration destination, and the migration is implemented with respect to the "vol1004" volume.

Next, the case where the implementation of migration is prohibited is described as another example. The description below assumes that "vol1002", for example, is selected as the volume for which the migration is to be implemented.

In step 1220, the purpose of use and position information of "vol1002" included in an area which decreased in the frequency of use are acquired from the storage configuration information 105. In other words, "Backup" is acquired as the purpose of use of "vol1002", "Kanto" as the position information layer 1, "Head Office" as the position information layer 2, and "First Center" as the position information layer 3.

Next, in step 1230, migration position conditions associated with the acquired purpose of use are acquired from the migration position management table 1002. In step 1240, since prohibition of the migration is set for all position information layers of the migration position conditions associated with "Backup" (the purpose of use), implementation of the migration is judged to be in a prohibited state. Therefore, processing is terminated without the migration being implemented.

During conventional migration processing, migration has been implemented with respect to all migratable (movable) volumes registered in storage configuration information 105. According to the above example, however, the implementation of the migration is limited.

That is to say, in the above-described first and second embodiments, prior to the implementation of the migration, the purpose of use of a migratable area is selected and a migration destination area is selected from the position conditions of all migration destinations previously classified according to the purpose of use. Thus, it is possible to limit the determination of the locations of the migratable areas and to prohibit the implementation itself of the migration. For example, even when migration is specified for an area reserved with "Backup" taken into consideration as the purpose of use, since implementation of the migration can be prohibited, the originally established relationship in position can be prevented from being disturbed. In addition, an area previously reserved as a backup area at a short-distanced position can be prevented from being moved to a long-distanced location, or an area reserved as a disaster recovery area at a long-distanced location can be prevented from being moved to a short-distanced one.

The present invention is not limited by the above-described embodiments and can take other embodiments with various further modifications. The present invention can take such a configuration as that of FIG. 15 showing yet another example of the position management table 107 shown in FIG. 15. In this example, information on distance is registered as position information according to the particular purpose of use of an area. That is, although default or backup processing is similar to that shown in FIG. 5, disaster recovery processing is conducted in accordance with distance information. Hence, a program for calculating the distance between districts is provided in the storage management server 100, and this program makes it possible to calculate the inter-district distance registered in the position information layer 1 of the storage management table 105, and to judge whether the thus-calculated distance satisfies position information registered in the position management table 107.

Assume, for example, that the data as shown on the display screen of FIG. 9 is specified. In step 610 of FIG. 6, "Location distanced through 500 km or more" is acquired as position information from the position management table 107. In step 620, position information on registered volumes "vol1002" to "vol1007" is sequentially taken out with, as its starting position, "Kanto" registered in the position information layer 1 of originally specified area "vol1001", and the distance between both locations is calculated. Since volumes "vol1002" to "vol1005" in this example all apply to "Kanto", zero is obtained as distance calculation results. However, since "vol1006" and "vol1007" both apply to "Kansai", calculation results on the distance between the destination and the starting position become, for example, 550 km. The thus-calculated distance satisfies the position information of "500 km or more" for the "Disaster Recovery" item in FIG. 15. Therefore, both "vol1006" and "vol1007" are selected. After this, in step 650, "vol1007" is to be selected as an unallocated volume. Subsequent other process steps are the same as those shown in FIG. 6.

An example of modification of the storage management allowing for migration can be taken as a further example of the present invention. In the examples described above, information is registered in position information layers 1 to 3 beforehand in connection with the purposes of use of areas, as shown in FIG. 14. In the modification example, however, a migration permission/prohibition flag is further added as a column associated with each volume in the storage configuration information 105 of FIG. 13. During implementation of migration, whether the migration is to be implemented is judged in step 1240 of FIG. 12 by referring to the column of the migration permission/prohibition flag. For example, by setting the flag to "No" (prohibited) for backup, the implementation of the migration can be easily prohibited.

It is also possible, as a further example of migration, to prohibit its implementation for the volumes registered as "Backup", by referring to the "Purpose of Use" column in FIG. 13 prior to implementing the migration.

Although several embodiments and modification examples have been described heretofore, it will be possible to embody the present invention in other forms without deviating from the scope of the invention.

According to the present invention, in connection with the allocation of virtualized storage areas, it is possible to reserve areas according to the purpose of use, such as backup or disaster recovery, with the positions of the areas taken into consideration.

It is also possible to perform setting operations on position information with the implementation of migration being taken into consideration. By prohibiting the implementation of migration for a specific purpose of use, for example, disaster recover, the positional relationship of an originally set area can be prevented from being disturbed.

What is claimed is:

1. A method for implementing migration with respect to storage areas, said areas being formed on a storage device managed by a storage management system, said method comprising the steps of:
   acquiring information on a purpose of use of a storage area for which the migration is to be implemented, and a relative physical position of said storage area, wherein the relative physical positions are relative positional relations according to a purpose of use and a physical position in which a previously allocated storage area is maintained;
   judging, with reference to the information acquired about the purpose of use and relative physical position of said storage area, whether the migration is to be implemented with respect to said storage area;
   selecting said storage area if judged to match required conditions with respect to relative positional relations for the previously allocated storage area and the storage area to be allocated, so that the unallocated storage area is varied based on the purpose of use and the relative physical position in which the previously allocated storage area is maintained;
   changing information of the storage management system on the storage areas, in accordance with the storage area selected and independently of the migration; and
   implementing the migration with respect to said storage area selected.

2. The method for implementing migration according to claim 1, wherein, if the purpose of use of said storage area is backup, the migration is not implemented with respect to said storage area.

3. A method for implementing migration with respect to storage areas, said areas being formed on a storage device managed by a storage management system, said method comprising the steps of:
   acquiring information on a purpose of use of a previously allocated storage area for which the migration is to be implemented;
   judging, with reference to the information acquired about the purpose of use of said storage area, whether the migration is to be implemented with respect to said storage area; and
   if it is judged that matching to required conditions relating relative physical location of said storage area is established, implementing the migration with respect to a storage area newly allocated as a migration destination such that the newly allocated storage area satisfies conditions with respect to relative positional relations for the previously allocated storage area and the newly allocated storage area, so that the newly allocated storage area is varied based on the purpose of use and the relative physical position in which the previously allocated storage area is maintained, and changing information on the storage areas, in accordance with storage area newly allocated and independently of the migration, and if the purpose of use of said storage area is backup, neither a storage area is newly reserved, nor is the migration implemented.

\* \* \* \* \*